(12) United States Patent
Oliver et al.

(10) Patent No.: US 8,843,581 B2
(45) Date of Patent: Sep. 23, 2014

(54) LIVE OBJECT PATTERN FOR USE WITH A DISTRIBUTED CACHE

(75) Inventors: Brian Oliver, Acton, MA (US); Noah Arliss, Lexington, MA (US)

(73) Assignee: Oracle International Corporation, Redwood Shores, CA (US)

(*) Notice: Subject to any disclaimer, the term of this patent is extended or adjusted under 35 U.S.C. 154(b) by 359 days.

(21) Appl. No.: 13/359,399

(22) Filed: Jan. 26, 2012

(65) Prior Publication Data

US 2012/0278422 A1 Nov. 1, 2012

Related U.S. Application Data

(60) Provisional application No. 61/479,342, filed on Apr. 26, 2011.

(51) Int. Cl.
*G06F 15/167* (2006.01)
*G06F 9/48* (2006.01)

(52) U.S. Cl.
CPC .................................. *G06F 9/4843* (2013.01)
USPC ........... 709/212; 711/112; 711/154; 717/126; 717/154; 717/169; 717/174

(58) Field of Classification Search
USPC ......................................................... 709/212
See application file for complete search history.

(56) References Cited

U.S. PATENT DOCUMENTS

| | | | |
|---|---|---|---|
| 7,574,706 B2* | 8/2009 | Meulemans et al. .......... | 717/174 |
| 7,711,920 B2* | 5/2010 | Borman et al. ................ | 711/170 |
| 2008/0109599 A1* | 5/2008 | Smith ............................ | 711/112 |
| 2011/0126173 A1* | 5/2011 | Tzoref et al. ................... | 717/126 |

* cited by examiner

*Primary Examiner* — Jude Jean Gilles
(74) *Attorney, Agent, or Firm* — Meyer IP Law Group

(57) ABSTRACT

A live object pattern is described that enables a distributed cache to store live objects as data entries thereon. A live object is a data entry stored in the distributed cache which represents a particular function or responsibility. When a live object arrives to the cache on a particular cluster server, a set of interfaces are called back which inform the live object that it has arrived at that server and that it should initiate to perform its functions. A live object is thus different from "dead" data entries because a live object performs a set of function, can be started/stopped and can interact with other live objects in the distributed cache. Because live objects are backed up across the cluster just like normal data entries, the functional components of the system are more highly available and are easily transferred to another server's cache in case of failures.

20 Claims, 2 Drawing Sheets

US 8,843,581 B2

LIVE OBJECT PATTERN FOR USE WITH A DISTRIBUTED CACHE

CLAIM OF PRIORITY

The present application claims the benefit of U.S. Provisional Patent Application No. 61/479,342, entitled "EVENT DISTRIBUTION PATTERN AND LIVE OBJECT PATTERN FOR A DISTRIBUTED DATA GRID," by Brian Oliver et al., filed on Apr. 26, 2011, which is incorporated herein by reference in its entirety.

CROSS REFERENCE TO RELATED APPLICATIONS

This patent application is related to the following U.S. patent application, which is incorporated by reference herein in its entirety:

U.S. patent application Ser. No. 13/359,396, entitled "EVENT DISTRIBUTION PATTERN FOR USE WITH A DISTRIBUTED DATA GRID", by Brian Oliver et al., filed on Jan. 26, 2012.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to data caching techniques in distributed computing environments and in particular to implementing active objects in conjunction with distributed caches.

BACKGROUND

Traditionally, when building distributed or clustered computer systems, various responsibilities are usually assigned to particular servers (nodes). This association is usually static, meaning that from that point on, the designated server will perform those responsibilities until it is shut down, crashes or is relieved of its responsibilities. For example, one server in the cluster may be designated to be a mail server which performs electronic mail responsibilities for the members of that cluster. If that server were to fail or crash, the responsibilities assigned to that server would disappear from the cluster unless some logic were implemented to recover or failover those responsibilities to another server. As a result, today there exist a large number of failover techniques that have been implemented for use in distributed systems to deal with such crashes and failures.

Static assignment of responsibilities to specific machines can be problematic in certain contexts. For example, in dynamic systems where servers are frequently added or removed from the cluster, it can be difficult to maintain static association of tasks to particular server nodes. For example, in the cloud computing context, servers are added dynamically when demand increases and removed when demand decreases. In many cases, this can create problems when trying to assign functions among the existing members of the cluster.

The various responsibilities mentioned above usually take the form of a software program or application. Almost invariably, applications require access to data that can be stored in a database or in a cache for faster access. Today, clustered caches are being used to store data for various applications on the network. In most instances, when an application requires a data entry, it first retrieves that data from the distributed cache, performs some processing involving that data and then writes/updates the data entry back to the cache.

BRIEF SUMMARY OF INVENTION

In accordance with various embodiments of the invention, a live object pattern is described that enables a distributed system such as a clustered cache to store live objects as data entries thereon. A live object is a data entry stored in the distributed cache which represents a particular function or responsibility. When a live object arrives to the cache on a particular cluster server, a set of interfaces are called back which inform the live object that it has arrived at that server and that it should initiate to perform its functions. A live object is thus different from "dead" data entries because a live object performs a set of function, can be started/stopped and can interact with other live objects in the distributed cache. Because live objects are backed up across the cluster just like normal data entries, the functional components of the system are more highly available and are easily transferred to another server in case of failures.

DETAILED DESCRIPTION

Figure 1:
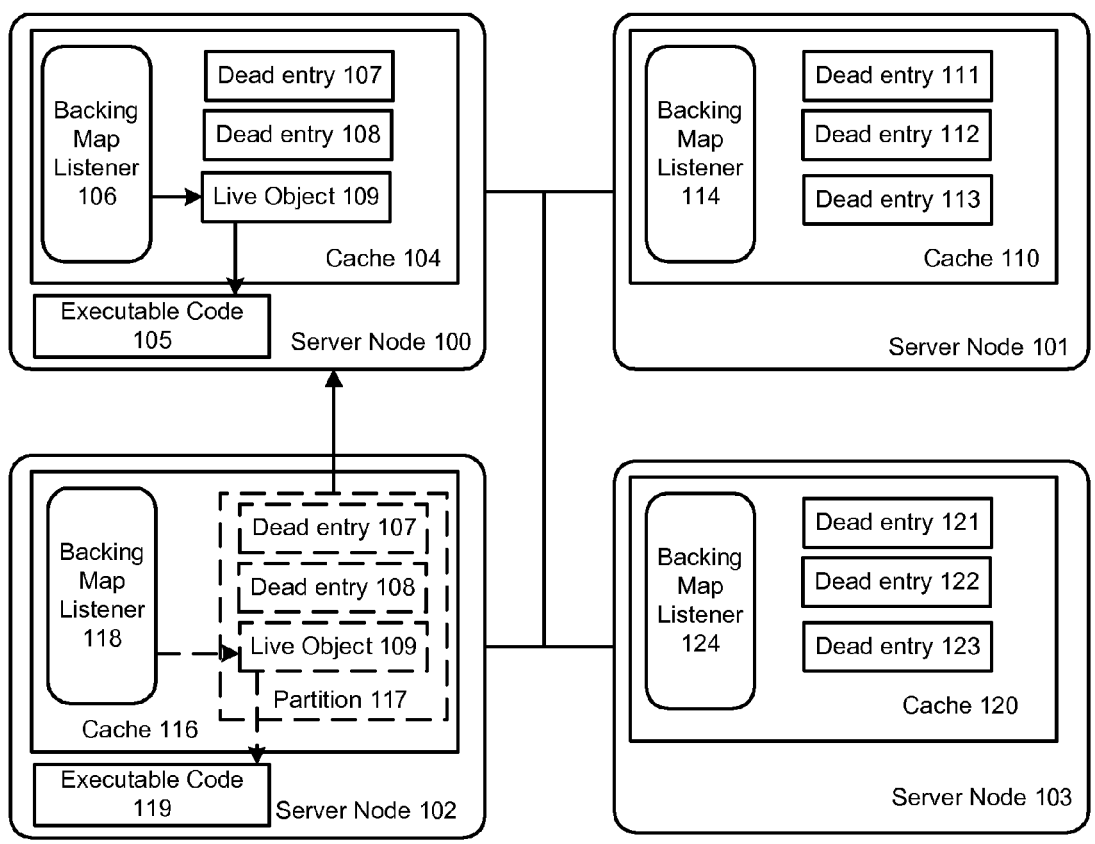
FIG. 1 is an illustration of the live object pattern, in accordance with various embodiments of the invention.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

In accordance with various embodiments of the invention, a live object pattern is described for use with a clustered cache or distributed data grid. The data grid (i.e. distributed cache) is a system composed of multiple servers that work together to manage information and related operations—such as computations—in a distributed environment. An in-memory data grid then is a data grid that stores the information in memory to achieve higher performance and uses redundancy by keeping copies of that information synchronized across multiple servers to ensure resiliency of the system and the availability of the data in the event of server failure. The data grid is used as a data management system for application objects that are shared across multiple servers, require low response time, high throughput, predictable scalability, continuous availability and information reliability. As a result of these capabilities, the data grid is ideally suited for use in computational intensive, stateful middle-tier applications. The data management is targeted to run in the application tier, and is often run in-process with the application itself, for example in the application server cluster. In accordance with an embodiment, the data grid software is middleware that reliably manages data objects in memory across a plurality of servers and also brokers the supply and demand of data between applications and data sources. In addition, the data grid can push the processing of requests closer to the data residing in the grid. Rather than pulling the necessary information to the server that will be executing the process, the data grid can push the processing of the request to the server that is storing the information locally. This can greatly reduce latency and improve data access speeds for applications.

In accordance with an embodiment, the live object pattern enables a distributed cache to store live objects as data entries thereon. A live object is a data entry stored in the distributed cache which represents a particular function or responsibility. When a live object arrives to the cache on a particular cluster server, a set of interfaces are called back which inform the object that it has arrived at that server and that it should initiate to perform its functions. A live object is thus different from "dead" data entries because a live object performs a set of functions, can be started/stopped and can interact with other live objects in the distributed cache. Because live objects are backed up across the cluster just like normal data entries, the functional components of the system are more highly available and are easily transferred to another server's cache in case of failures.

FIG. 1 is an illustration of the live object pattern, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

Illustrated in this figure is a cluster of four server nodes (100, 101, 102, 103) that have a distributed cache (104, 110, 116, 120) residing thereon. The distributed caches store a number of data entries (107-109, 111-113, 121-123) and a backing map listener (106, 114, 118, 124). Some of the data entries in the cache are "dead" entries as they are simple data and do not perform any functionality. A subset of the data entries, however can be live objects which are data within the distributed cache, however which have a lifecycle of their own and are capable of taking actions based on state changes.

In accordance with an embodiment, the live object is a cache entry in the distributed data grid. It can be placed into the cache by executing a standard "insert" or "put" operation. When the live object 109 arrives in the cache 104, a customized baking map listener 106 on that node detects that the object implementing a particular interface has arrived in the cache and invokes its start method. Thereafter, this particular data entry in the cache becomes live and running and can execute actions according to state changes. For example, every time an event occurs, the live object may receive a call back to perform a particular action, such as the replication of the event to a particular recipient or channel.

As illustrated in this figure, a live object 109 can arrive on a server node 100 during a partition 117 transfer from server 102 to server 100. Because the cache is clustered, each cache on a node contains a subset (partition) of data entries that are stored across the entire network. In accordance with an embodiment, this partition can also be backed up on another node in the cluster. In the event that the node hosting the live object fails, the live object can be promoted from the backup to the primary cache one of the remaining different nodes. Upon recovering the live object to the primary cache on the new node, the recovered live object would become activated. This provides the same fault tolerance and high availability as is provided to the data in the clustered cache.

In accordance with various embodiments, live objects may be used to model configuration, scheduled jobs and points of integration with resources external to the distributed data cluster. Most cached entries can be considered dead objects because they do not react or perform an action when interacted with. A live object is one that handles or processes events that occur on or about itself. Thus, when an object self-processes its events, the processing may further self-mutate or change the state of the said object thus causing it move to another state or stage in its lifecycle. That series of state changes can be considered an object's lifecycle.

In accordance with an embodiment, a live object is simply a cache entry in the distributed data grid. Upon each mutation (state change) of the live object, the distributed data grid backs up the state of the object and thus, live objects are always recoverable to a well-known state. In addition, the data grid can implement both distributed live objects and replicated live objects. A distributed live object is distributed across members (nodes) of the cluster. A replicated live object is where every member of the cluster contains the same live object.

In accordance with an embodiment, the executable source code (105 and 119) can be deployed on every server node in the cluster. The live object then contains the configuration information for executing that source code on the particular server where the live object has been initiated. As such, the configuration information for the source code is placed in the cache as a data entry and can be moved around the cluster as needed.

In accordance with various embodiments, several implementations of the live object pattern are possible within the data grid. In one implementation, a developer can use a backing map listener (BML) to capture events on cache entries in the distributed data grid. BML can then be used to call methods on the mutated cache entry (live object). In addition, the distributed data grid can provide an application programming interface (API) to implement the live object pattern. The API can include methods for implementing the live object interface. For example, a developer can have the following options of live object types for implementation:

Option 1: Implement LiveObject interface
Option 2: Implement AsynchronousLiveObject interface
Option 3: Implement EventProcessor<EntryEvent>
Option 4: Extend AbstractLiveObject
Option 5: Extend AbstractAsynchronousLiveObject
Option 6: Extend AbstractEventProcessor<EntryEvent>
Option 7: Extend AbstractAsynchronousEventProcessor<EntryEvent>

Figure 2:
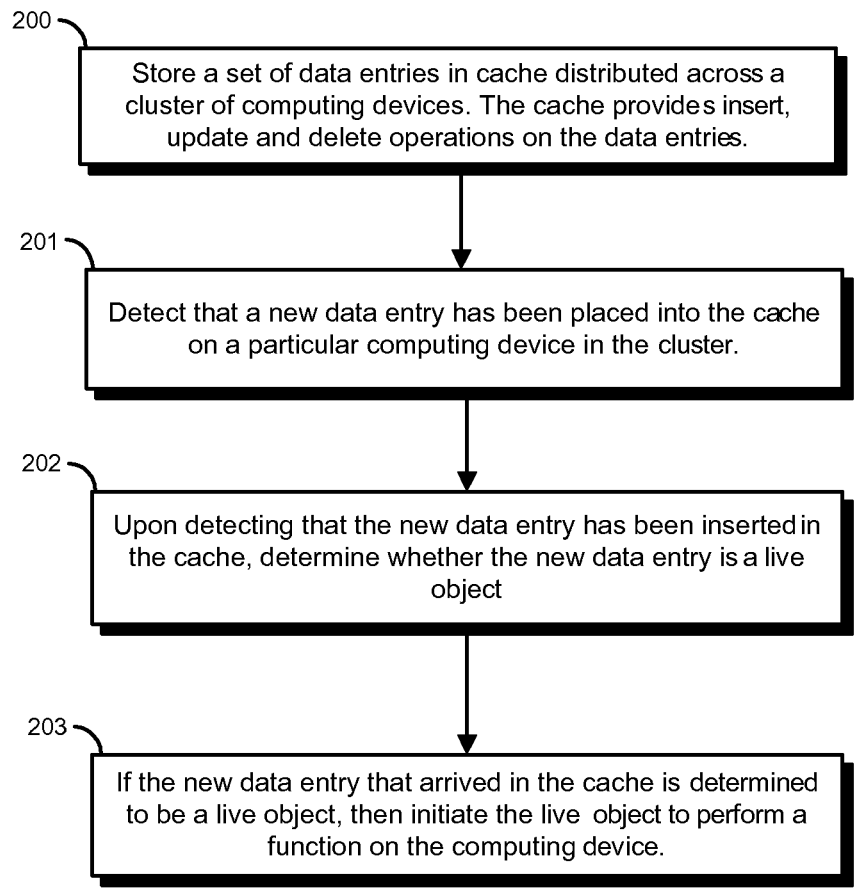
FIG. 2 is a flow chart illustration of live object pattern, in accordance with various embodiments of the invention.

FIG. 2 is a flow chart illustration of live object pattern, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As illustrated in the figure, in step 200, a set of data entries are stored in a cache distributed across a cluster of computing devices. The cache provides insert, update and delete operations on the data entries. In step 201, the cache can detect that a new data entry has been placed into the cache on a particular computing device in the cluster. This can be done by performing a simple insert operation to place data into the cache. In step 202, when the new data entry has been placed in the cache, it is determined whether the new data entry is a live object. If the new data entry is determined to be a live object, the cache can then call back on the live object to perform a function on the particular computing device (step 203). This can be performed by invoking its start method or by some other means. Once the live object is initiated, the executable source code deployed on the server is executed to perform various functions. These functions can include any action that can be performed by an object of an application, such as detecting an occurrence of an event or state change, replicating information, transmitting messages to other entities or live objects, reading and writing data, and the like.

Throughout the various contexts described in this disclosure, the embodiments of the invention further encompass computer apparatus, computing systems and machine-readable media configured to carry out the foregoing systems and methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A method for providing a live object pattern for a distributed data grid, said method comprising:
   storing a set of data entries in a cache distributed across a cluster of computing devices, said cache providing insert, update and delete operations on said data entries;
   detecting that a new data entry has been placed into said cache on a particular computing device in said cluster or that a data entry is modified on said cache on a particular computing device in said cluster;
   determining whether the new data entry is a live object upon detecting that the new data entry has been mutated in the cache; and
   if said new data entry is determined to be the live object, calling the live object to perform a function on the particular computing device.

2. The method of claim 1, wherein the cache further includes a backing map listener that activates the live object upon detecting that the live object has been inserted in said cache.

3. The method of claim 1, wherein executable code associated with the live object is deployed on all computing devices in said cluster.

4. The method of claim 3, wherein the live object contains configuration information for the executable code deployed on all said computing devices in the cluster.

5. The method of claim 1, wherein a plurality of said live objects are activated in the cluster and wherein the plurality of said live objects interact with each other by transmitting messages to one another.

6. The method of claim 1, wherein the live object is backed up to the cache on at least one other computing device in the cluster.

7. The method of claim 1, wherein the live object is transferred as part of a data partition transfer between two computing devices in the cluster.

8. The method of claim 1, wherein the live object includes at least one interface that is called back to initiate the live object.

9. The method of claim 1, wherein the cache further stores a set of data entries that do not perform any function.

10. The method of claim 1, wherein the live object is stopped by the particular computing device upon shut down of said particular computing device.

11. A system for providing a live object pattern for a distributed data grid, said system comprising:
    a cluster of computing devices having a distributed cache residing thereon, said distributed cache storing a set of data entries and providing insert, update and delete operations on said data entries;
    wherein the cache detects that a new data entry has been placed into said cache on a particular computing device in said cluster or that a data entry is modified on said cache on a particular computing device in said cluster, determines whether the new data entry is a live object upon detecting that the new data entry has been inserted in the cache, and if said new data entry is determined to be the live object, calls the live object to perform a function on the particular computing device.

12. The system of claim 11, wherein the cache further includes a backing map listener that activates the live object upon detecting that the live object has been inserted in said cache.

13. The system of claim 11, wherein executable code associated with the live object is deployed on all computing devices in said cluster.

14. The system of claim 13, wherein the live object contains configuration information for the executable code deployed on all said computing devices in the cluster.

15. The system of claim 11, wherein a plurality of said live objects are activated in the cluster and wherein the plurality of said live objects interact with each other by transmitting messages to one another.

16. The system of claim 11, wherein the live object is backed up to the cache on at least one other computing device in the cluster.

17. The system of claim 11, wherein the live object is transferred as part of a data partition transfer between two computing devices in the cluster.

18. The system of claim 11, wherein the live object includes at least one interface that is called back to initiate the live object.

19. The system of claim 11, wherein the cache further stores a set of data entries that do not perform any function.

20. A non-transitory computer readable storage medium storing one or more sequences of instructions executed by one or more processors to perform a set of steps comprising:
   storing a set of data entries in cache distributed across a cluster of computing devices, said cache providing insert, update and delete operations on said data entries;
   detecting that a new data entry has been placed into said cache on a particular computing device in said cluster or that a data entry is modified on said cache on a particular computing device in said cluster;
   determining whether the new data entry is a live object upon detecting that the new data entry has been inserted in the cache; and
   if said new data entry is determined to be the live object, initiating the live object to perform a function on the particular computing device.

* * * * *